(12) United States Patent
Watanabe

(10) Patent No.: US 6,362,855 B1
(45) Date of Patent: Mar. 26, 2002

(54) SPECIAL-EFFECT-WAVEFORM GENERATOR

(75) Inventor: Yuichi Watanabe, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/257,546

(22) Filed: Feb. 24, 1999

(30) Foreign Application Priority Data

Feb. 27, 1998 (JP) ............................................. 10-062143

(51) Int. Cl.[7] .................................................. H04N 9/74
(52) U.S. Cl. ...................................... 348/594; 348/593
(58) Field of Search ................................. 348/593, 594, 348/580, 584, 595, 601, 181, 182; 315/368.18; H04N 9/74

(56) References Cited

U.S. PATENT DOCUMENTS 4,751,579 A * 6/1988 Okunishi et al. ............ 348/594
6,043,852 A * 3/2000 Nakata ........................ 348/594

FOREIGN PATENT DOCUMENTS

| JP | 60-102068 | 6/1985 |
| JP | 61-220570 | 9/1986 |
| JP | 63-123280 | 5/1988 |
| JP | 64-12149 | 2/1989 |
| JP | 1-26229 | 5/1989 |

* cited by examiner

Primary Examiner—Michael Lee
(74) Attorney, Agent, or Firm—Dickstein Shapiro Morin & Oshinsky LLP

(57) ABSTRACT

To provide a special-effect-waveform generator capable of corresponding to signal formats of various television systems such as SDTV, EDTV-2, and HDTV.

The special-effect-waveform generator is provided with a pulse generation circuit 11 for generating a control pulse used to generate the waveform data for constituting a special-effect waveform suitable for a signal format designated by an external unit, a basic-wave generation circuit 12 for generating the waveform data for constituting a basic wave in accordance with a control pulse supplied from the pulse generation circuit, an interpolation circuit 13 for interpolating the waveform data for constituting a basic wave generated by the basic-wave generation circuit, a selection circuit 15 for selecting either of the waveform data interpolated by the interpolation circuit and the waveform data for constituting a basic wave supplied from the basic-wave generation circuit in accordance with the signal format, and line memories 16 and 17 for rearranging the waveform data for constituting a wave supplied from the selection circuit and outputting the data as a special-effect waveform.

10 Claims, 12 Drawing Sheets

(EDTV-2 CASE)

|  | SDTV | | HDTV | EDTV-2 |
| --- | --- | --- | --- | --- |
|  | COMPONENT SYSTEM | COMPOSITE SYSTEM | | |
| CLOCK PULSE CP | 13.5 MHZ | 14.3 MHZ | 37.125 MHZ | 36 MHZ |
| HORIZONTAL PULSE HP | 15.7 KHZ (858 CLOCKS) | 15.7 KHZ (910 CLOCKS) | 33.75 KHZ (1100 CLOCKS) | 15.7 KHZ (2288 CLOCKS) |
| VERTICAL PULSE VP | 59.94 HZ (262.5 H) | 59.94 HZ (262.5 H) | 59.94 HZ (262.5 H) | 59.94 HZ (262.5 H) |

Fig. 3

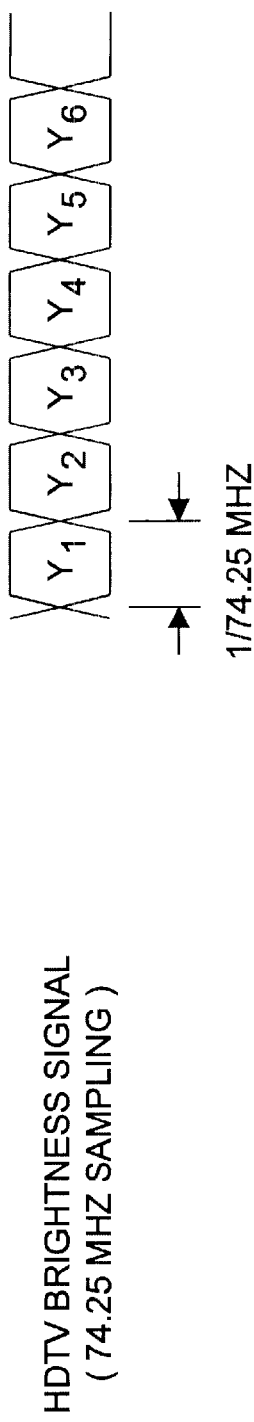
Fig. 11(A)
HDTV BRIGHTNESS SIGNAL
(74.25 MHZ SAMPLING)
Fig. 11(B)
HDTV BRIGHTNESS SIGNAL Y1 LAYER
Fig. 11(C)
HDTV BRIGHTNESS SIGNAL Y2 LAYER

SPECIAL-EFFECT-WAVEFORM GENERATOR

BACKGROUND OF THE INVENTION

The present invention relates to a special-effect-waveform generator used for, for example, a vide o sub-adjuster (production switcher), particularly to a special-effect-waveform generator for generating a wipe waveform used to synthesize a plurality of video pictures.

For example, special-effect-waveform generator for generating a wipe waveform adapted to a standard definition television (SDTV) or a high definition television (HDTV) has been known so far. A special-effect apparatus using the special-effect-waveform generator performs the processing concerned with levels and time at the stage of a video signal when displaying an image based on the video signal obtained by picking up the signal with a television camera on a screen and thus, the apparatus is used to obtain a desired video effect.

Several apparatuses for generating a special effect are disclosed in the following official gazettes. For example, the official gazette of Japanese Patent Laid-Open No. 102068/1985 discloses a "special-effect apparatus". The special-effect apparatus is provided with two DVE (Digital Video Effect) units corresponding to each of video signals of two channels so as to obtain two-channel DVE interlocking effect by supplying wipe waveforms having polarities different from each other generated by a waveform generator to respective DVE unit. In the official gazette of Japanese Patent Laid-Open No. 102068/1985, a special-effect-waveform generator is shown as a waveform generator but the structure of the waveform generator is not disclosed.

Moreover, the official gazette of Japanese Patent Laid-Open No. 220570/1986 discloses a "special-effect-waveform generator". The special-effect-waveform generator is constituted so as to solve the problem that, when synthesizing a contracted image generated in accordance with an input key signal and a video signal by using the same key signal, a phase shift occurs between the image and the signal because it takes a lot of time to contract the image and thereby, it is impossible to follow the quick operation of a fader. The special-effect-waveform generator eliminates the phase shift by generating two effect waveforms whose delay times are different from each other for a fader control signal, generates contracted images by using one effect waveform, and synthesizes the images by using the other effect waveform.

Furthermore, the official gazette of Japanese Patent Laid-Open No. 123280/1988 discloses a "digital special-effect apparatus". The digital special-effect apparatus makes it possible to completely interlock a video signal with a key signal by processing the signals with a digital special-effect circuit.

Furthermore, the official gazette of Japanese Patent Publication No. 12149/1989 discloses a "special-effect waveform controller". According to the special-effect waveform controller, it is possible to cut out a screen at any position of each special-effect waveform and obtain waveform-size data in which the waveform size does not change even if a positioner changes in the middle of a fader.

Furthermore, the official gazette of Japanese Patent Publication No. 26229/1989 discloses a "video special-effect signal generator". The video special-effect signal generator makes it possible to provide many horizontal basic waves and vertical basic waves by constituting a memory for storing horizontal and vertical basic waves with an erasable memory so as to be able to store the waveform data generated by a central processing unit.

Problems to be Solved by the Invention:

However, an art for generating a special-effect waveform capable of corresponding to a plurality of television systems is not disclosed in any one of the above official gazettes of Japanese Patent Laid-Open Nos. 220570/1986 and 123280/1989 and Japanese Patent Publication Nos. 12149/1989 and 26229/1989. Thus, because a conventional special-effect-waveform generator is constituted exclusively for each television system such as the SDTV or HDTV, there is a problem that the production efficiency is low. Therefore, it is desired to develop a special-effect-waveform generator that can be used for these television systems in common.

Furthermore, an extended definition television (EDTV) obtained by improving the SDTV has been recently developed and a second-generation EDTV-2 in which the aspect ratio is particularly extended to 4:3 or more is practically used. Therefore, it is desired to develop a special-effect-waveform generator capable of also corresponding to the "4:2:0p" system of the EDTV-2 in addition to the above SDTV and HDTV.

SUMMARY OF THE INVENTION

The present invention is made to meet the above requests and its object is to provide a special-effect-waveform generator capable of corresponding to signal formats of various television systems such as the SDTV, EDTV-2, and HDTV.

To achieve the above object, the special-effect-waveform generator of the first mode of the present invention comprises:

a pulse generation circuit for generating a control pulse used to generate waveform data for constituting a special-effect waveform suitable for a signal format designated from an external unit;

a basic-wave generation circuit for generating waveform data for constituting a basic wave in accordance with the control pulse output from the pulse generation circuit;

an interpolation circuit for interpolating the waveform data for constituting the basic wave generated by the basic-wave generation circuit; and a selection circuit for selecting either of the waveform data interpolated by the interpolation circuit and the waveform data output from the basic-wave generation circuit in accordance with the signal format and outputting the selected waveform data as the waveform data for constituting a special-effect waveform.

The special-effect-waveform generator of the first mode outputs the waveform data for constituting a basic wave as the waveform data for constituting a special-effect waveform when the signal format for the SDTV is designated. Moreover, the generator outputs the waveform data in which the waveform data for constituting a basic wave is interpolated as the waveform data for constituting a special-effect waveform when the signal format for the HDTV is designated.

Therefore, when a device cannot operate because the frequency of a clock pulse is too high like a signal for the HDTV, it is possible to obtain a waveform same as the case of the device operated at the frequency of the original clock pulse through interpolation by operating the device at a frequency half the frequency of a clock pulse. Therefore, the special-effect-waveform generator of the first mode is able to correspond to both the SDTV and HDTV without requiring special hardware.

Moreover, for the same purpose, the special-effect-waveform generator of the second mode of the present invention comprises:

a pulse generation circuit for generating a control pulse used to generate waveform data for constituting a special-effect waveform suitable for a signal format designated from an external unit;

a basic-wave generation circuit for generating waveform data for constituting a basic wave in accordance with the control pulse output from the pulse generation circuit; and a line memory for rearranging the waveform data for constituting the basic wave generated by the basic-wave generation circuit and outputting the rearranged waveform data as the waveform data for constituting a special-effect waveform.

The special-effect-waveform generator of the second mode outputs the waveform data for constituting a basic wave as the waveform data for constituting a special-effect waveform when the signal format for the SDTV is designated, similarly to the case of the special-effect-waveform generator of the first mode. Moreover, the generator outputs the waveform data generated by rearranging the waveform data for constituting a basic wave with a line memory as the waveform data for constituting a special-effect waveform when the signal format for the EDTV-2 is designated.

Therefore, because the special-effect-waveform generator of the second mode is able to correspond to the "4:2:0p" system corresponding to the progressive scan system for the EDTV-2, the generator is able to correspond to both SDTV signal and EDTV-2 signal.

Moreover, for the same purpose, the special-effect-waveform generator of the third mode of the present invention comprises:

a pulse generation circuit for generating a control pulse used to generate waveform data for constituting a special-effect waveform suitable for a signal format designated from an external unit;

a basic-wave generation circuit for generating waveform data for constituting a basic wave in accordance with the control pulse output from the pulse generation circuit;

an interpolation circuit for interpolating the waveform data for constituting the basic wave generated by the basic-wave generation circuit;

a selection circuit for selecting either of the waveform data interpolated by the interpolation circuit and the waveform data output from the basic-wave generation circuit in accordance with the signal format; and a line memory for rearranging the waveform data output from the selection circuit and outputting the rearranged waveform data as a special-effect waveform.

The special-effect-waveform generator of the third mode outputs a basic signal as a special-effect waveform when the signal format for the SDTV is designated, the waveform data in which a basic wave is interpolated as a special-effect waveform when a signal format for the HDTV is designated, and a waveform generated by rearranging the waveform data for constituting a basic wave as a special-effect waveform when the signal format for the EDTV-2 is designated. Therefore, the special-effect-waveform generator of the third mode is able to correspond to any one of the SDTV, HDTV, and EDTV-2.

In the case of the special-effect-waveform generators of the first and second modes, the selection circuit can be constituted so as to alternately select the waveform data output from the basic waveform generation circuit and the waveform data output from the interpolation circuit when the waveform data interpolated by the interpolation circuit in accordance with any one of the signal formats is selected and thereby, output the selected waveform data as the waveform data for constituting a special-effect waveform.

According to the above structure, it is possible to correspond to the four-layer-divided HDTV processing through the same control by using an interpolation circuit. That is, when performing the four-layer-divided processing at the time of the HDTV, it is possible to operate four circuits of the SDTV through completely the same control. This is because it is unnecessary to change the level difference between Y1 and Y2 with control data since interpolation is used though waveform data is generated by using a clock of 37.125 MHz in the above Y1 and Y2 layers.

Moreover, the special-effect-waveform generators of the second and third modes can be constituted so that the line memory is constituted with a first line memory and a second line memory, the first line memory successively stores the waveform data output from the selection circuit for the first half horizontal period, the second line memory successively stores the waveform data output from the selection circuit for the next half horizontal period, and thereafter the content in the first line memory and the content in the second line memory are alternately read. According to the above structure, it is possible to minimize the number of line memories used.

BRIEF DESCRIPTION OF DRAWINGS

FIG. 3 is an illustration for explaining the frequencies of clock, horizontal, and vertical pulses sued for the special-effect-waveform generator of the embodiment of the present invention in FIG. 1;

FIGS. 11(A) to 11(C) are illustrations for explaining operations when the HDTV is designated by the special-effect-waveform generator of the embodiment of the present invention in FIG. 1.

DETAILED DESCRIPTION OF PREFERRED EMBODIMENT

Then, the special-effect-waveform generator of an embodiment of the present invention is described below in detail by referring to the accompanying drawings. The special-effect-waveform generator generates a wipe waveform corresponding to the signal formats of the SDTV, EDTV-2, and HDTV.

Figure 1:
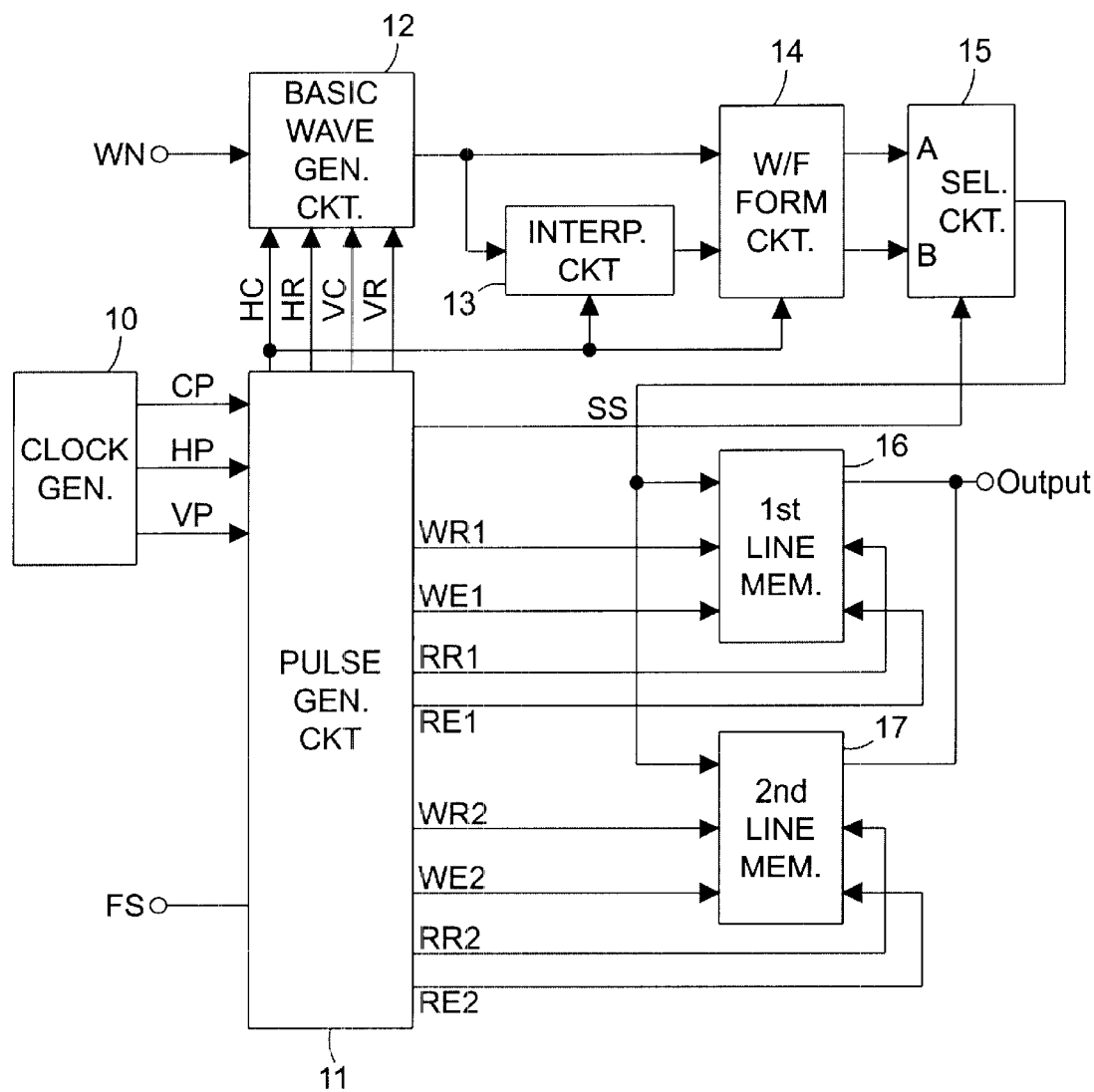
FIG. 1 is a block diagram showing the structure of the special-effect-waveform generator of an embodiment of the present invention.

FIG. 1 is a block diagram showing the structure of a special-effect-waveform generator. The special-effect-waveform generator is constituted with a clock generator 10, a pulse generation circuit 11, a basic-wave generation circuit 12, an interpolation circuit 13, a waveform formation circuit 14, a selection circuit 15, a first line memory 16, and a second line memory 17.

The clock generator 10 generates a clock pulse CP, a horizontal pulse HP, and a vertical pulse VP and supplies them to the pulse generation circuit 11. Timings of the clock pulse CP, horizontal pulse HP, and vertical pulse VP generated by the clock generator 10 are shown in the timing charts of FIG. 2.

The clock pulse CP is a basic clock for operating the special-effect-waveform generator. The frequency of the clock pulse CP is equal to the sampling frequency of a brightness signal or a frequency half the sampling frequency. Therefore, as shown in FIG. 3, the frequency of the clock pulse CP is equal to 13.5 MHz when a video signal encoded by the component system (D1) is handled and 14.3 MHz when a video signal encoded by the composite system (D2) is handled in the case of the SDTV. In the case of the HDTV, the frequency of the clock pulse CP is equal to 37.125 obtained by halving the sampling frequency 74.25 MHz of the brightness signal or 37.088 MHz. Moreover, in the case of the EDTV-2, the frequency of the clock pulse CP is equal to 36 MHz that is the transmission clock of the "4:2:0p" system.

Furthermore, the horizontal pulse HP is a pulse generated every horizontal period (shown by "1H" in the drawings of this specification). The frequency of the horizontal pulse HP is equal to 15.7 kHz 858 clocks) in the case of the component system (D1) of the SDTV, 15.7 kHz (910 clocks) in the case of the composite system (D2), 33.75 kHz (1,100 clocks) or 33.72 kHz in the case of the HDTV, and 15.7 kHz (2,288 clocks) in the case of the "4:2:0p" system of the HDTV.

Furthermore, the vertical pulse VP is a pulse generated every vertical period (shown by "1V" in the drawings of this specification). The frequency of the vertical pulse VP is equal to 59.94 Hz in the case of the SDTV and EDTV-2 and either of 60 Hz and 59.9 Hz in the case of the HDTV. In the case of the HDTV, it is assumed that the clock pulse CP has a frequency of 37.125 kHz, the horizontal pulse HP has a frequency of 33.75 kHz, and the vertical pulse VP has a frequency of 59.9 Hz in the following description.

Furthermore, a format selection signal FS is supplied to the pulse generation circuit 11 from, for example, a CPU (not illustrated). The format selection signal FS is used to designate any one of the above television systems. Each signal format is determined by the format selection signal FS.

The pulse generation circuit 11 generates a control pulse corresponding to the input format selection signal FS in accordance with the input clock pulse CP, horizontal pulse HP, or vertical pulse VP. Specifically, the pulse generation circuit generates a horizontal clock HC, horizontal reset pulse HR, vertical clock VC, and vertical reset pulse VR and supplies them to the basic-wave generation circuit 12. The horizontal clock HC is also supplied to an interpolation circuit 13 and a wave formation circuit 14.

Figure 2:
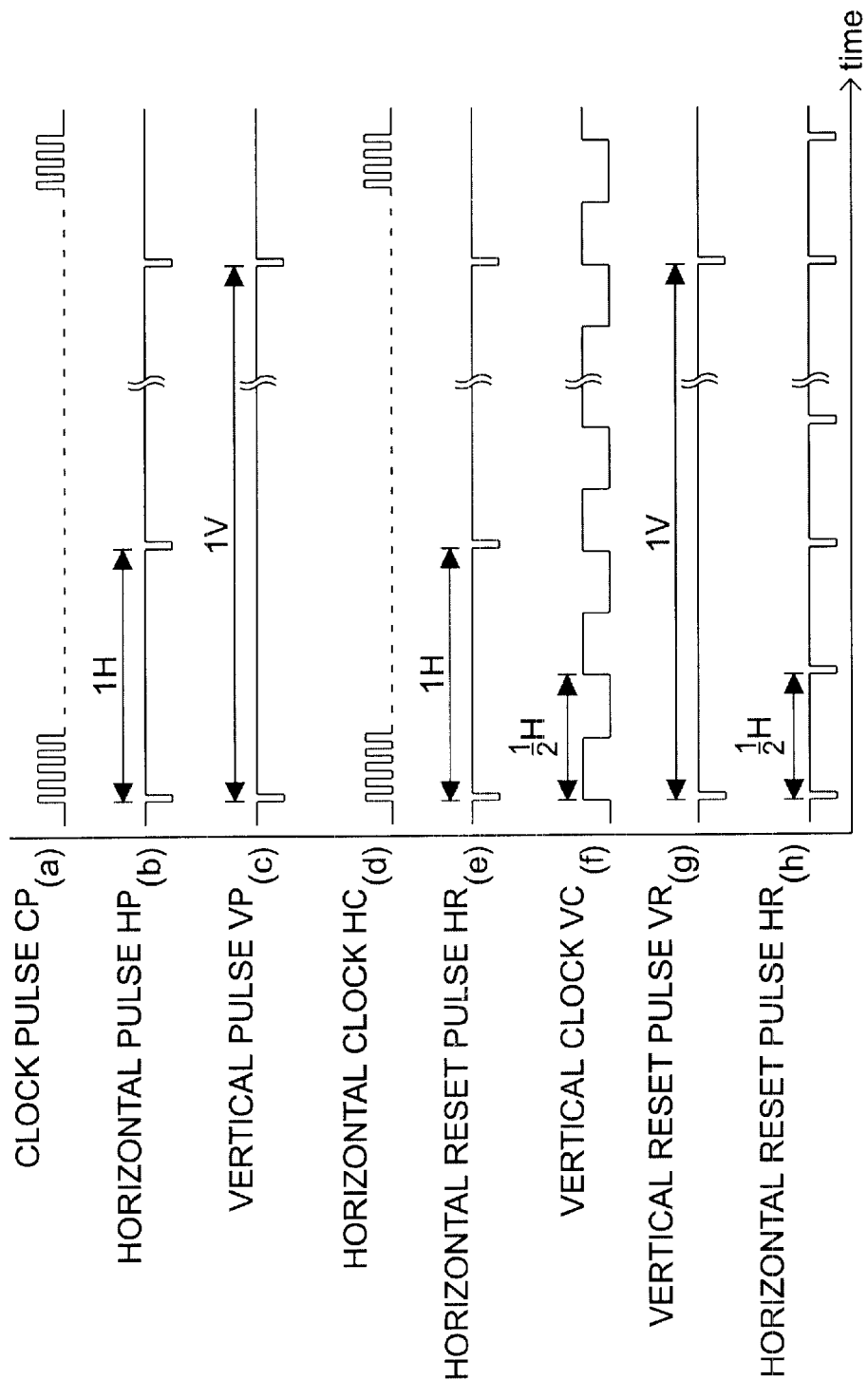
FIG. 2 is timing charts showing operations of the special-effect-waveform generator of the embodiment of the present invention in FIG. 1.

Timings of the horizontal clock HC, horizontal reset pulse HR, vertical clock VC, and vertical reset pulse VR generated by the pulse generation circuit 11 are shown in FIG. 2. The horizontal clock HC is the same as the pulse CP as shown. Moreover, the horizontal reset pulse HR is a pulse generated every horizontal period as shown in FIG. 2 in the case of the SDTV and HDTV and a pulse generated every half horizontal period as shown in the case of the EDTV-2. The vertical clock VC is a pulse of half horizontal period as shown in FIG. 2 and the vertical reset pulse VR is a pulse of one vertical period as shown.

Moreover, the pulse generation circuit 11 generates a selection signal SS and supplies it to a selection circuit 15. The selection signal SS is set to a low level (hereafter shown as "L level") in the case of the SDTV and EDTV-2 and to a high level (hereafter shown as "H level") in the case of the HDTV.

Furthermore, the pulse generation circuit 11 generates a first write reset pulse WR1, first write enable pulse WE1, first read reset pulse RR1, and first read enable pulse RE1 and supplies them to the first line memory 16 and moreover, generates a second write reset pulse WR2, second write enable pulse WE2, second read reset pulse RR2, and second read enable pulse RE2 and supplies them to the second line memory 17. These pulses to be supplied to the first line memory 16 and the second line memory 17 are hereafter generally referred to as "line-memory control pulse". The timing of the line-memory control pulse is described later by referring to FIG. 12.

As described above, the horizontal clock HC, horizontal reset pulse HR, vertical clock VC, and vertical reset pulse VR are input to the basic-wave generation circuit 12 from the pulse generation circuit 11. Moreover, a waveform number WN is input to the basic-wave generation circuit 12 from a not-illustrated CPU. The waveform number WN specifies the type of a waveform generated by the basic-wave generation circuit 12. The basic-wave generation circuit 12 generates the waveform data for constituting a basic wave in accordance with these input horizontal clock HC, horizontal reset pulse HR, vertical clock VC, vertical reset pulse VR, and waveform number WN.

Figure 4:
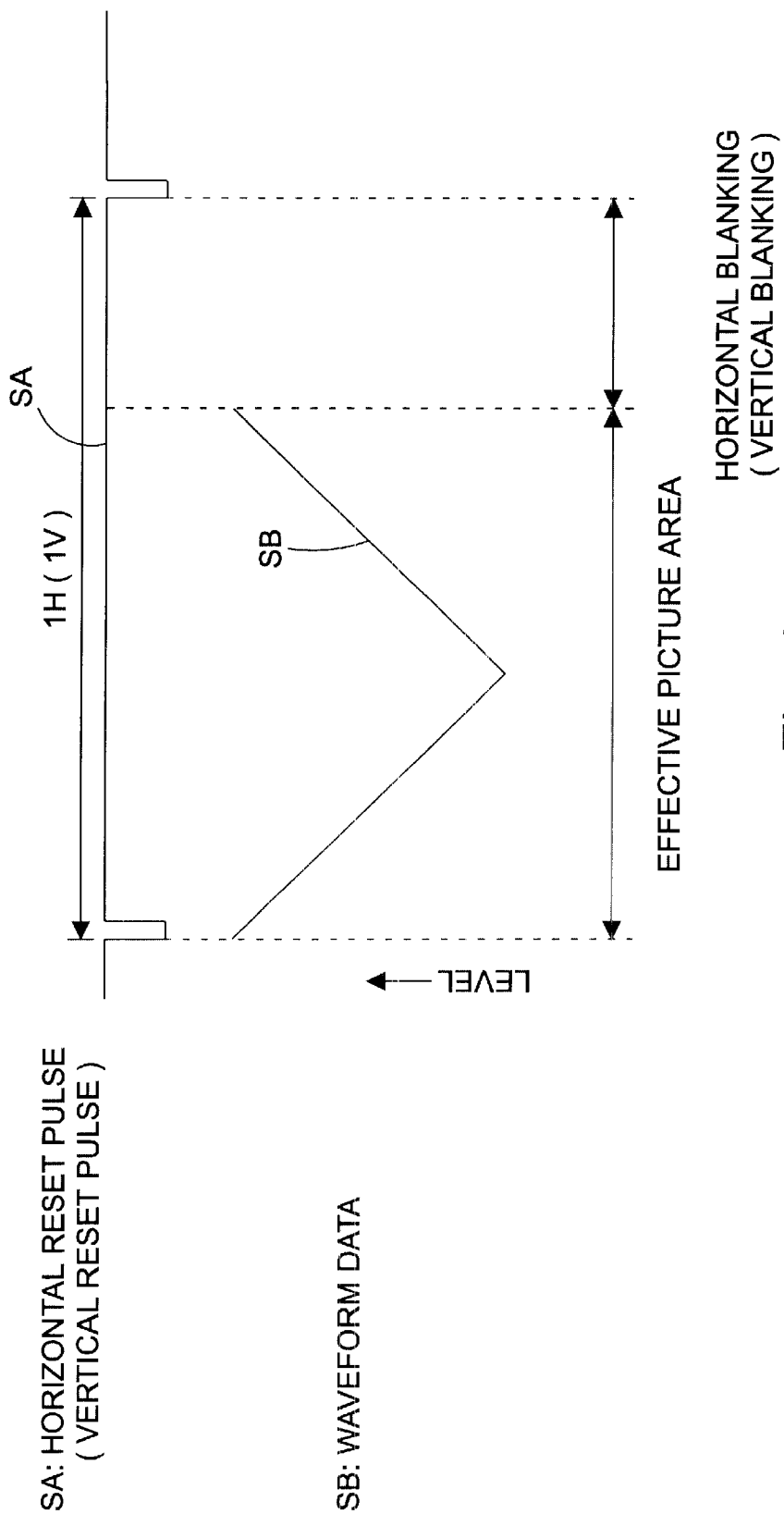
FIG. 4 is timing charts showing operations of the basic-wave generation circuit of the special-effect-waveform generator of the embodiment of the present invention in FIG. 1.

FIG. 4 is a timing chart showing an operation for generating a basic wave in the basic-wave generation circuit 12. A horizontal-directional basic wave (hereafter referred to as "horizontal basic wave") is generated as described below. That is, when the horizontal reset pulse HR becomes active (L-level) as shown by SA in FIG. 4, generation of the waveform data for constituting a horizontal basic wave is started. Then, as shown by SB in FIG. 4, the waveform data for constituting a horizontal basic wave is successively generated synchronously with the horizontal clock HC. When generation of the waveform data for a horizontal basic wave is completed up to a predetermined position in one horizontal period determined as an effective screen, generation of waveform data is stopped. Remaining section in one horizontal period is horizontal blanking.

Similarly, a vertical-directional basic wave (hereafter referred to as "vertical basic wave") is generated as described below. That is, when the vertical reset pulse VR becomes active (L-level) as shown by parentheses of SA while the shape of a vertical basic wave is designated by the waveform number WN, generation of the waveform data for constituting the vertical basic wave is started. Then, as shown in FIG. 4(B), the waveform data for constituting the vertical basic wave is successively generated synchronously with the vertical clock VC. When generation of the waveform data of the vertical basic wave is completed up to a predetermined position in one vertical period determined as an effective screen, generation of waveform data is stopped. Remaining section in one vertical period is vertical blanking.

The waveform data for constituting a horizontal basic wave and the waveform data for constituting a vertical basic wave which are generated as described above are nonaddition-synthesized and thereby, the waveform data for constituting a basic wave is generated. The waveform data for constituting the basic wave generated by the basic-wave generation circuit 12 is successively supplied to the interpolation circuit 13 and waveform formation circuit 14 synchronously with the horizontal pulse HP. Moreover, the operation for generating the waveform data for constituting he basic wave generated by the basic-wave generation circuit 12 is described later more minutely.

The interpolation circuit 13 performs interpolation, that is, the processing for interpolating two input adjacent waveform data values and then outputs the data values. The interpolation circuit 13 is used due to the following reason. That is, in the case of the HDTV, a device may not operate because the frequency of the clock pulse CP is too high. Therefore, the basic-wave generation circuit 12, interpolation circuit 13, and waveform formation circuit are operated by setting the frequency of the clock pulse CP to a value half a sampling frequency and thereby, the waveform data for constituting a basic wave is generated.

However, under the above state, the amount of waveform data only half the case of operating the above circuits at an original sampling frequency can be obtained. Therefore, the special-effect-waveform generator is provided with the interpolation circuit 13 to interpolate the waveform data generated as described above. Thereby, waveform data at the intermediate point of a sampling interval is obtained. Therefore, the effect same as the case of doubling a sampling frequency is realized and the amount of waveform data same as the case of operating the above circuits at an original sampling frequency is obtained. Thus, a smoother waveform is obtained.

The interpolation circuit 13 operates in any case of the SDTV, HDTV, and EDTV-2. However, the selection circuit 15 at the rear stage selects the waveform data sent from the interpolation circuit 13 through the waveform formation circuit 14 only in the case of the HDTV. Therefore, the interpolation circuit 13 effectively functions when the HDTV is designated. The waveform data for constituting a basic wave output from the interpolation circuit 13 is supplied to the waveform formation circuit 14.

The waveform formation circuit 14 slices the waveform data for constituting a basic wave output from the basic-wave generation circuit 12 and the waveform data output from the interpolation circuit 13 in accordance with the waveform-size information designated by a not-illustrated CPU and forms the data synchronously with the horizontal pulse HP. The waveform data for constituting a basic wave output from the basic-wave generation circuit 12 formed by the waveform formation circuit 14 is supplied to the input terminal A of the selection circuit 15 and the waveform data output from the interpolation circuit 13 is supplied to the input terminal B of the selection circuit 15.

The selection circuit 15 selects either of the waveform data for constituting a basic wave input to the input terminal A and the waveform input to the input terminal B in accordance with the selection signal SS output from the pulse generation circuit 11. That is, when the SDTV and EDTV-2 are designated by the format selection signal FS and thereby, the selection signal SS is set to L level, the input terminal-A side is selected. Thereby, the selection circuit 15 outputs the waveform data sent from the basic-wave generation circuit 12 through the waveform formation circuit 14.

Moreover, when the HDTV is designated by the format selection signal FS and thereby, the selection signal SS is set to H level, the input terminal-B side is selected. Thereby, the selection circuit 15 outputs the waveform data sent from the basic-wave generation circuit 12 through the interpolation circuit 13. A signal output from the selection circuit 15 is supplied to the first line memory 16 and the second line memory 17.

The first line memory 16 and second line memory 17 are provided to correspond to the processing of the "4:2:0p" system corresponding to the progressive scan system for the EDTV-2. Therefore, when the SDTV and HDTV are designated, the memories 16 and 17 do not substantially function but they operate as mere delay circuits.

In the case of the first line memory 16, read and write operations are controlled by the first write reset pulse WR1, first write enable pulse WE1, first read reset pulse RR1, and first read enable pulse RE1 output from the pulse generation circuit 11.

Similarly, in the case of the second line memory 17, read and write operations are controlled by the second write reset pulse WR2, second write enable pulse WE2, second read reset pulse RR2, and second read enable pulse RE2 output from the pulse generation circuit 11. Outputs of the first line memory 16 and the second line memory 17 are wired-OR-processed. Moreover, either of the first read enable pulse RE1 and the second read enable pulse RE2 is activated and thereby, waveform data is read out of either of the first line memory 16 and the second line memory 17 and output to an external unit as the final waveform data.

Then, operations of the special-effect-waveform generator having the above structure are described below for each system by referring to the accompanying drawings.

(SDTV system)

First, operations when the SDTV is designated are described. It is assumed that the special-effect-waveform generator handles video signals encoded by the component system (D1).

When the SDTV is designated in accordance with the format selection signal FS supplied from a not-illustrated CPU, the clock generator 10 outputs a clock pulse CP having a frequency equal to the sampling frequency of a brightness signal, that is, a clock pulse CP of 13.5 MHz. Moreover, the clock generator 10 outputs a horizontal pulse HP of one horizontal period (15.7 kHz) and a vertical pulse VP of one vertical period (59.94 Hz). These clock pulse CP, horizontal pulse HP, and vertical pulse VP are supplied to the pulse generation circuit 11.

The pulse generation circuit 11 generates a horizontal clock HC of 13.5 MHz same as the clock pulse CP, a horizontal reset pulse HR of one horizontal period (15.7 kHz), a vertical clock VC of half horizontal period (6.75 kHz), and a vertical reset pulse of one vertical period (59.9 Hz) in accordance with the input clock pulse CP, horizontal pulse HP, and vertical pulse VP and supplies them to the basic-wave generation circuit 12. Thereby, the basic-wave generation circuit 12 starts generating the waveform data for constituting a basic wave.

Figure 5A:
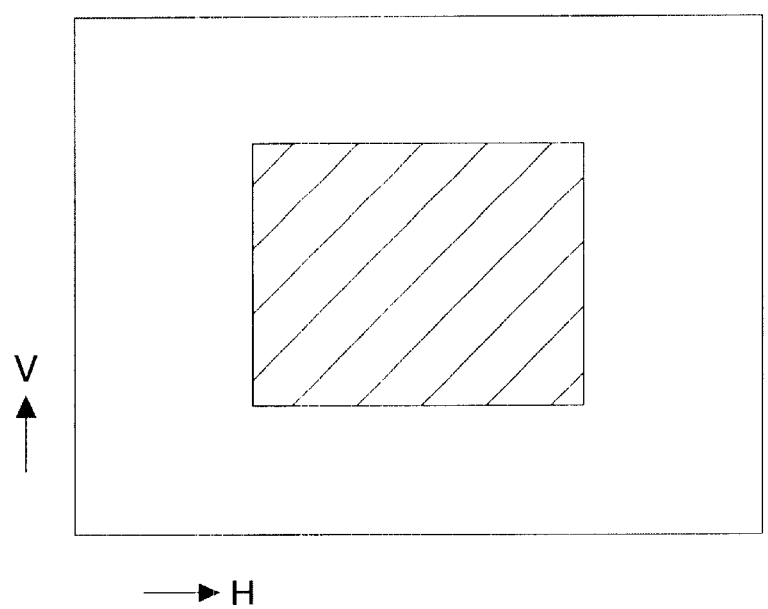
FIGS. 5(A) and 5(B) are illustrations for explaining the operation (1) when the SDTV is designated by the special-effect-waveform generator of the embodiment of the present invention in FIG. 1.

The basic-wave generation circuit 12 is able to generate various waveforms correspondingly to the waveform number WN designated by a not-illustrated CPU. Hereafter, however, an operation of the basic-wave generation circuit 12 is described by using the case of generating the wipe waveform shown in FIG. 5(A) as an example.

Figure 5B:
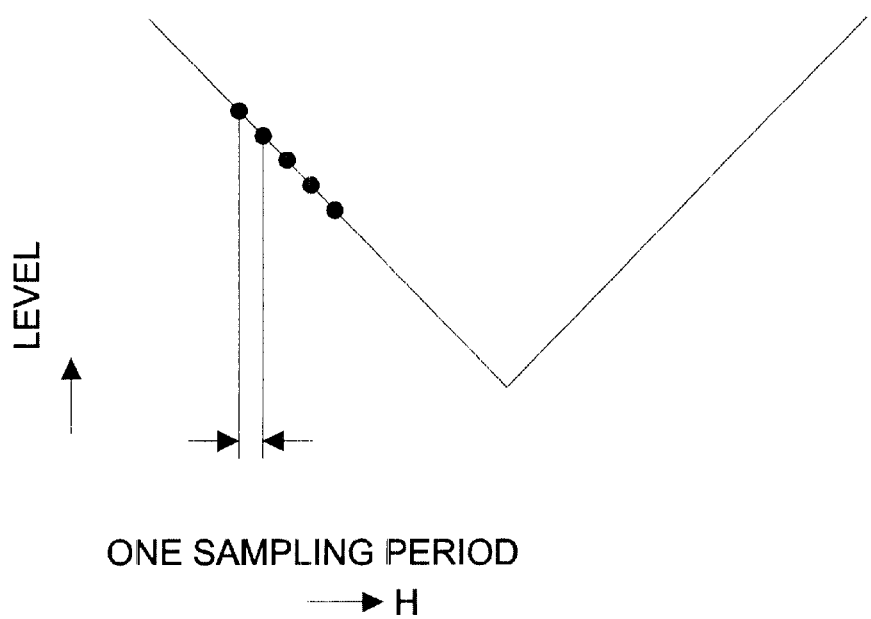

First, the waveform data for constituting the horizontal basic waveform shown in FIG. 5(B) is generated in accordance with the clock pulse CP and horizontal reset pulse HR. The black points in FIG. 5(B) respectively denote the peak value at each sampling point and the interval between abscissa-directional black points denotes one sampling period.

Moreover, the basic-wave generation circuit 12 generates the waveform data for constituting a vertical basic wave in accordance with the vertical clock VC, vertical reset pulse VR, and horizontal reset pulse HR. The black points in FIG. 6(A) respectively denote the peak value at the sampling point of an odd field and the white points respectively denote the peak value at the sampling point of an even field. This is a technique having been known so far and is briefly described below. The interval between abscissa-directional black and white points is equal to half horizontal period, showing the interval between vertical clocks VC. Moreover, in an odd field, black points are sampled in accordance with the horizontal reset pulse HR and the interval between abscissa-directional black points denotes one horizontal period. Furthermore, in an even field, white points are sampled in accordance with the horizontal reset pulse HR because the even field is shifted from an odd field by half horizontal period and the interval between abscissa-directional white points is equal to one horizontal period.

Figure 6A:
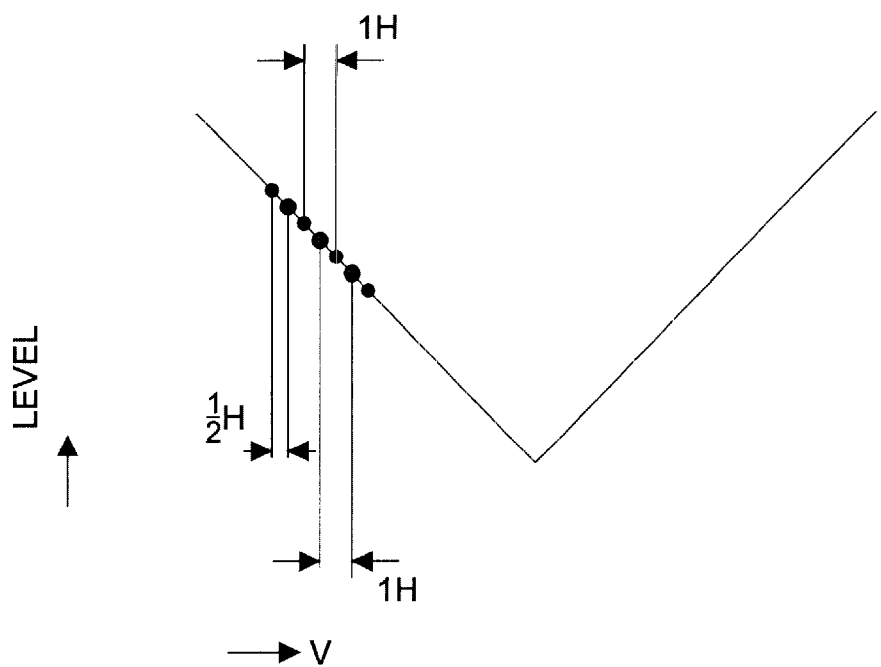
FIGS. 6(A) and 6(B) are illustrations for explaining the operation (2) when the SDTV is designated by the special-effect-waveform generator of the embodiment of the present invention in FIG. 1.
Figure 6B:
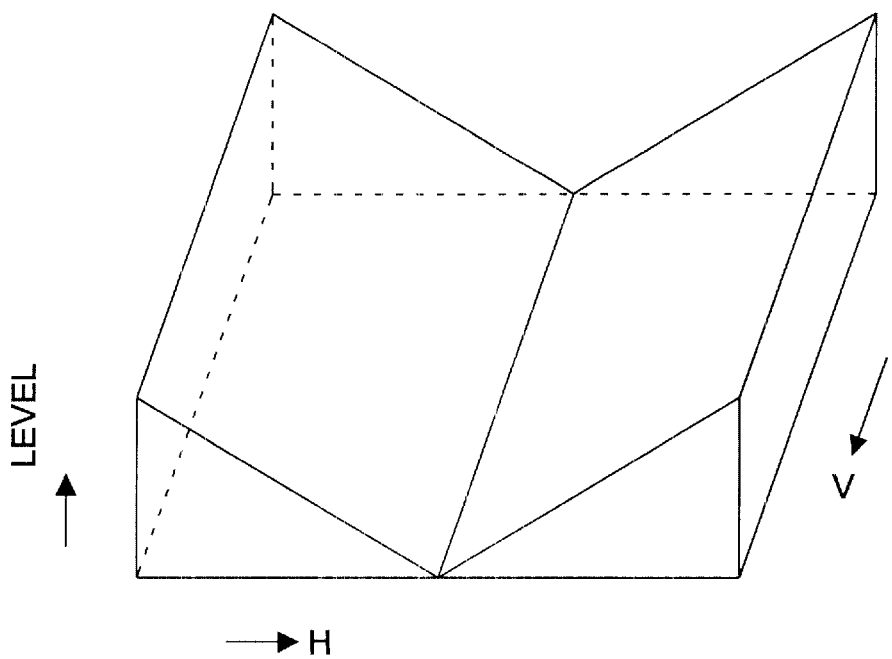
Figure 7A:
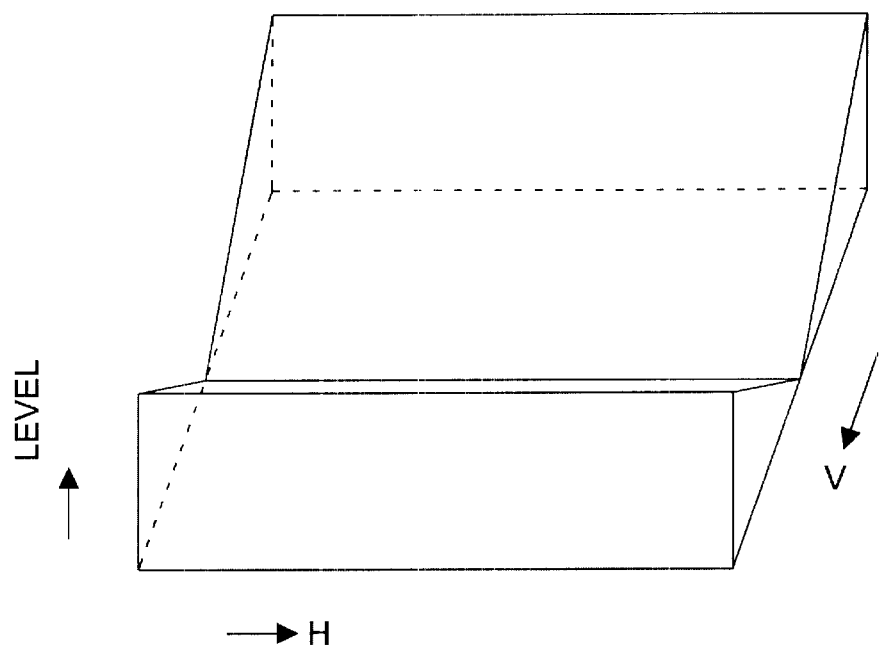
FIGS. 7(A) and 7(B) are illustrations for explaining the operation (3) when the SDTV is designated by the special-effect-waveform generator of the embodiment of the present invention in FIG. 1.
Figure 7B:
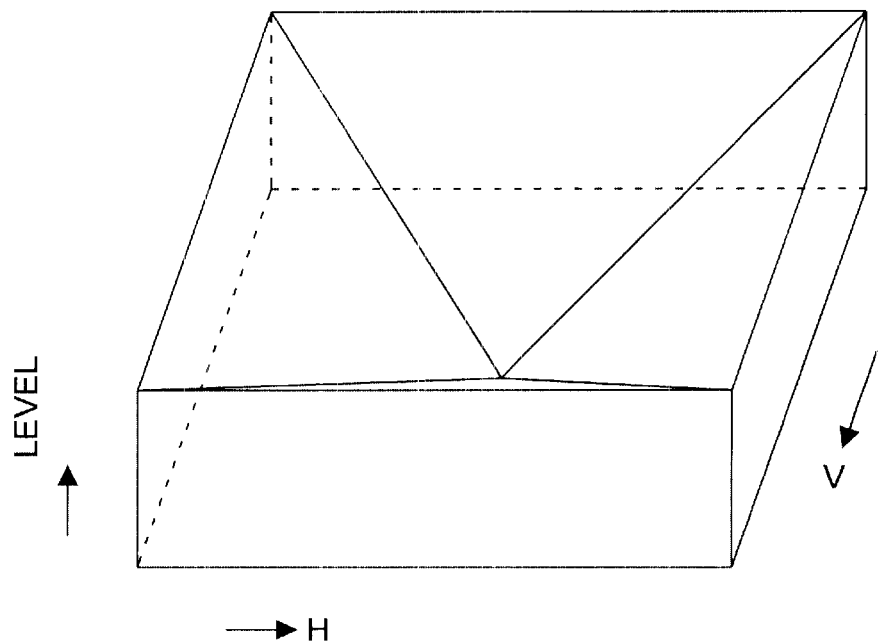

In this case, when assuming the horizontal direction as X-axis and the vertical direction as Y-axis, the waveform in FIG. 5(B) can be expressed as the three-dimensional waveform shown in FIG. 6(B). Similarly, the waveform in FIG. 6(A) can be expressed as the three-dimensional waveform shown in FIG. 7(A). By synthesizing these waveforms through non-add mixing so as to select one having the highest level, the basic wave shown in FIG. 7(B) is obtained. The waveform data for constituting the basic wave is supplied to the interpolation circuit 13 and waveform formation circuit 14 as an output of the basic-wave generation circuit 12.

The interpolation circuit 13 applies interpolation to the waveform data for constituting the basic wave output from the basic-wave generation circuit 12. As described above, however, when the SDTV is designated by the format selection signal FS (when the frequency of the clock pulse PC is equal to a sampling frequency), the output of the interpolation circuit 13 is not used.

Figure 8A:
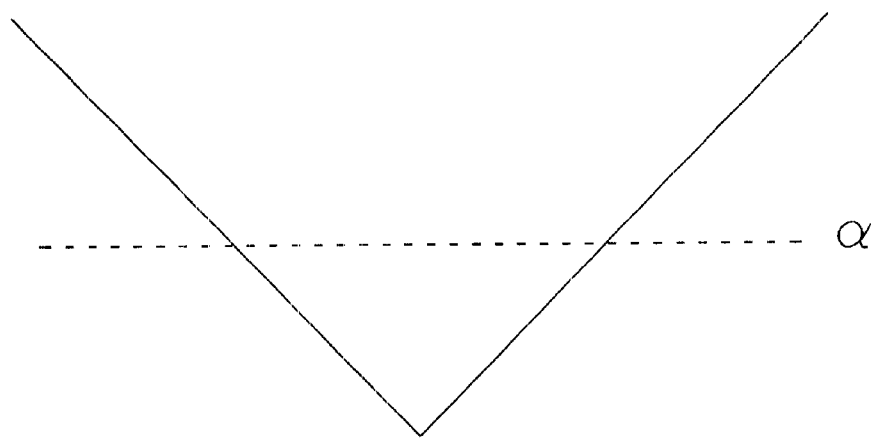
FIGS. 8(A) and 8(B) are illustrations for explaining the operation (4) when the SDTV is designated by the special-effect-waveform generator of the embodiment of the present invention in FIG. 1.
Figure 8B:
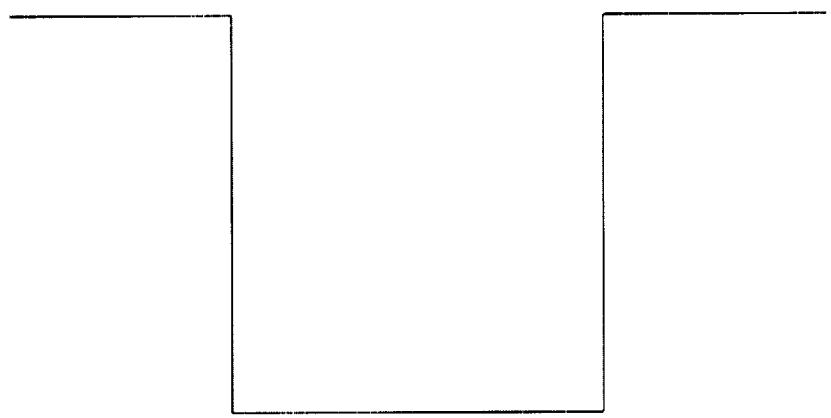

The waveform formation circuit 14 slices and forms a waveform output from the basic-wave generation circuit 12 in accordance with the waveform size information supplied from a not-illustrated CPU. FIG. 8(A) schematically shows a two-dimensional waveform at one scanning line. By stretching a waveform at a slice level a corresponding to the waveform size information, the waveform shown in FIG. 8(B) is obtained. In this case, a portion having a high level corresponds to the white region in FIG. 5(A) and a portion having a low level corresponds to the hatched region in FIG. 5(A). The waveform thus formed by the waveform formation circuit 14 is supplied to the selection circuit 15.

As described above, in the case of the SDTV, the input terminal-A side of the selection circuit 15 is always selected in accordance with the selection signal SS supplied from the pulse generation circuit 11. Therefore, the selection circuit 15 supplies the waveform data for constituting a basic wave sent from the basic-wave generation circuit 12 through the waveform formation circuit 14 to the first line memory 16 and the second line memory 17.

The first line memory 16 and second line memory 17 are necessary only when the EDTV-2 is designated to be described later in detail and the SDTV is unnecessary. However, the first line memory 16 and second line memory 17 are set so that the special-effect-waveform generator can be used by a plurality of television systems in common. Therefore, when the SDTV is designated, the first line memory 16 and the second line memory 17 only pass the waveform data supplied from the selection circuit 15 but they do not substantially function. More minutely, the first line memory 16 and the second line memory 17 respectively function as a delay circuit for delaying input waveform data by the minimum delay time or more.

Figure 9:
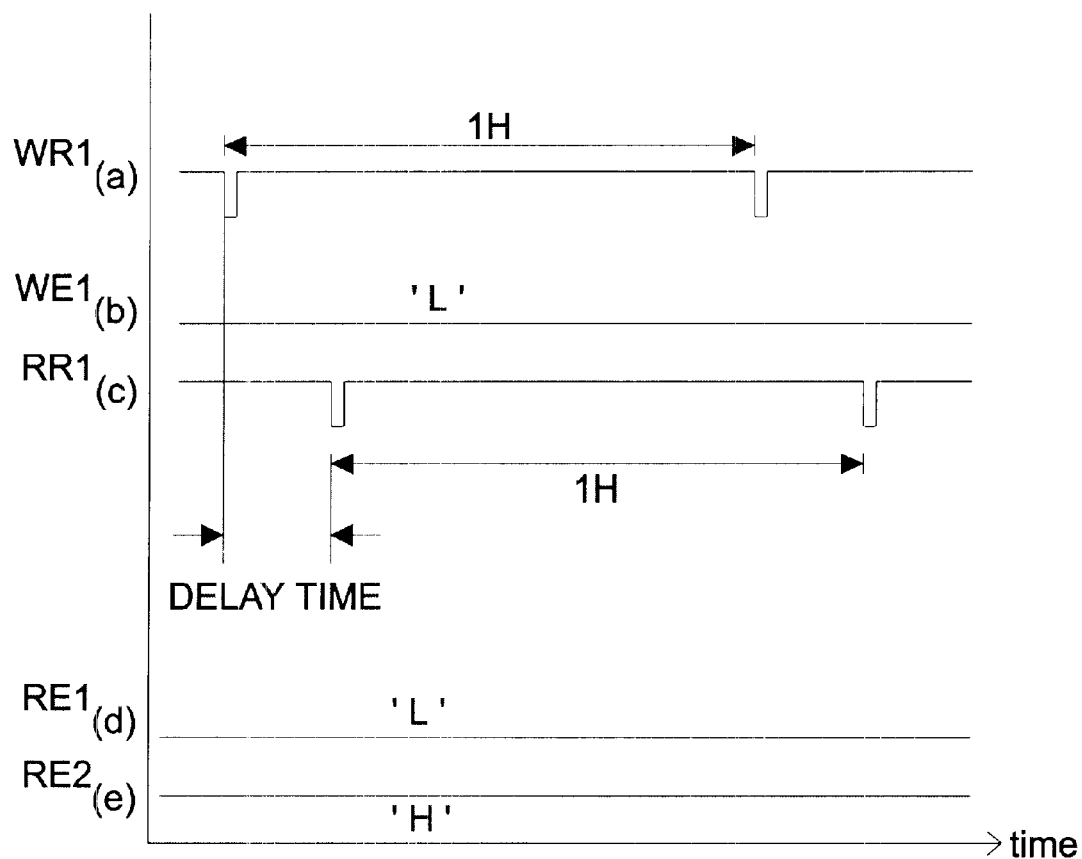
FIG. 9 is timing charts showing operations of first and second line memories when the SDTV and HDTV are designated by the special-effect-waveform generator of the embodiment of the present invention in FIG. 1.

FIG. 9 shows operational timing charts of the first line memory 16 and second line memory 17 in the case of the SDTV. The first read enable pulse RE1 is normally set to L level as shown in FIG. 9 and the second read enable pulse RE2 is normally set to H level. Therefore, because the output terminal of the second line memory 17 becomes disable and the output terminal of the first line memory 16 becomes enable, the waveform data supplied from the selection circuit 15 passes through the first line memory 16 to be supplied to an external unit. Therefore, the second write reset pulse WR2, second write enable pulse WE2, and second read reset pulse RR2 serving as signals for controlling the second line memory 17 can be set to either of H and L levels.

Moreover, the first write enable pulse WE1 to be supplied to the first line memory 16 is normally set to L level. Therefore, after the first reset pulse WR1 becomes active (L-level), write of the waveform data supplied from the selection circuit 15 into the first line memory 16 is started. Then, after the first read reset pulse RR1 becomes active (L-level), read of the waveform data from the first line memory 16 is started. Therefore, the time until the first read reset pulse RR1 becomes active after the first write reset pulse WR1 becomes active serves as the delay time of the first line memory 16. The waveform data read from the first line memory 16 is normally transmitted to an external unit because the first read pulses RE1 #1 to #4 are normally set to L level.

(HDTV system)

Then, operations when the HDTV is designated are described below.

When the HDTV is designated in accordance with the format selection signal FS supplied from a not-illustrated CPU, the clock generator 10 outputs a clock pulse CP having a frequency half the sampling frequency of a brightness signal, that is, a clock pulse CP of 37.125 MHz. In the case of the HDTV, a brightness signal generally has a sampling frequency of 74.25 MHz. However, the clock pulse CP uses a frequency obtained by halving the sampling frequency because of the speed performance of a device.

Moreover, the clock generator 10 outputs a horizontal pulse HP of one horizontal period (33.75 kHz) and a vertical pulse VP of one vertical period (59.9 Hz) and supplies them to the pulse generation circuit 11.

The pulse generation circuit 11 generates a horizontal clock HC of 13.5 MHz same as the clock pulse CP, a horizontal reset pulse HR of one horizontal period (33.75 kHz), a vertical clock VC of half horizontal period (6.75 kHz), and a vertical rest pulse VR of one vertical period (59.94 Hz) in accordance with the input clock pulse CP, horizontal pulse HP, and vertical pulse VP and supplies them to the basic-wave generation circuit 12. Thereby, the basic-wave generation circuit 12 starts generating the waveform data for constituting a basic wave. The operation for generating he waveform data for constituting a basic wave by the basic-wave generation circuit 12 is the same as the case of the above SDTV. The waveform data for constituting the basic wave generated by the basic-wave generation circuit 12 is supplied to the interpolation circuit 13 and the waveform formation circuit 14.

Figure 10:
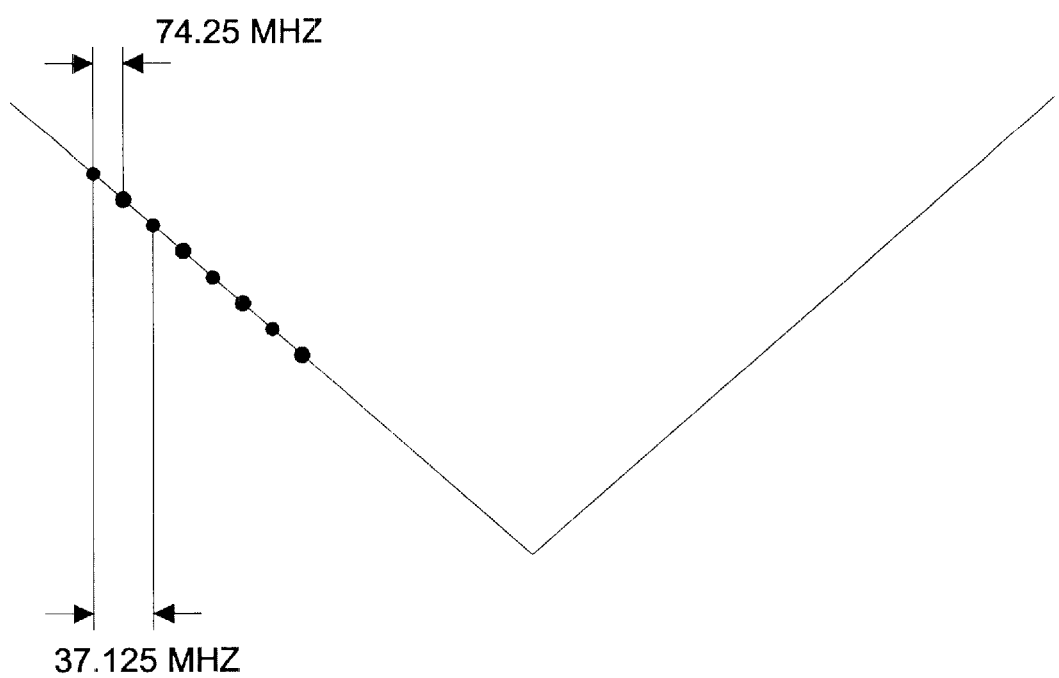
FIG. 10 is an illustration for explaining the operation when the HDTV is designated by the special-effectwaveform generator of the embodiment of the present invention in FIG. 1.

As described above, when the HDTV is designated, the clock pulse CP having a frequency half the sampling frequency is used in order to securely operate a device. Therefore, the interpolation circuit 13 is used to synchronize a video signal sampled at a sampling frequency of 74.25 MHz with a basic wave generated by the special-effect-waveform generator. Description is continued by referring to FIG. 10. In FIG. 10, a black point denotes the peak value at each sampling point of a sampling frequency of 37.125 MHz and a white point denotes the peak value generated through the interpolation of adding the black points before and after the white point and dividing the black points by 2. Thereby, because the waveform data same as the case of performing sampling at a sampling frequency of 74.25 MHz is obtained, it is possible to generate a smooth waveform.

The waveform data thus generated by the interpolation circuit 13 and the waveform data for constituting the basic wave supplied from the basic-wave generation circuit 12 are formed by the waveform formation circuit 14 and supplied to the selection circuit 14. As described above, when the HDTV. is designated, the input terminal-B side of the selection circuit 15 is normally selected in accordance with the selection signal SS output from the pulse generation circuit 11. Therefore, the selection circuit 15 supplies the waveform data sent from the interpolation circuit 13 through the waveform formation circuit 14 to the first line memory 16 and second line memory 17. Operations of the first line memory 16 and second line memory 17 are the same as the case of the SDTV above described.

Hereafter, a case of using an output signal of a special-effect-waveform generator operated in accordance with a clock pulse CP having a frequency (37.125 MHz) half a sampling frequency with a production switcher or the like for performing the processing when the HDTV is designated by dividing the processing into four layers is described.

When dividing the processing into four layers, two adjacent sampled brightness signals are divided into two layers such as Y1 and Y2 to form four layers by using color difference signals Pb and Pr sampled at a sampling frequency of 37.125 MHz in order to process a brightness signal sample at a sampling frequency of 74.25 MHz at a processing clock frequency of 37.125 MHz.

Description is continued by referring to FIGS. 11(A) to 11(C). By dividing two adjacent brightness signals shown in FIG. 11(A), the Y1 layer shown in FIG. 11(B) serves as the odd-numberth pixel and the Y2 layer shown in FIG. 11(C) serves as the even-numberth pixel. By dividing the rightness signals as described above, output signals of the special-effect-waveform generator corresponding to these brightness signals represent that the input terminal B of the election circuit 15 is selected in the Y2 layer when the input terminal A of the selection circuit 15 is selected in the Y1 layer from the viewpoint of the relation between FIG. 10 and FIG. 11.

(EDTV-2 system)

Then, operations according to the "4:2:0p" system corresponding to the progressive scan system for the EDTV-2 are described below.

When the EDTV-2 is designated in accordance with the format selection signal FS supplied from a not-illustrated CPU, the clock generator 10 outputs a 36-MHz clock pulse CP serving as a transmission clock of the "4:2:0p" system. Moreover, the clock generator 10 outputs a horizontal pulse HP of one horizontal period (15.7 kHz) and a vertical pulse VP of one vertical period (59.94 Hz). The clock pulse CP, horizontal pulse HP, and vertical pulse VP are supplied to the pulse generation circuit 11.

The pulse generation circuit 11 generates a 36-MHz horizontal clock HC same as the clock pulse CP, a horizontal reset pulse HR of half horizontal period (6.75 kHz), a vertical clock VC of half horizontal period (6.75 kHz), and a vertical reset pulse VR of one vertical period (59.94 Hz) in accordance with the input clock pulse CP, horizontal pulse HP, vertical pulse VP and supplies them to the basic-wave generation circuit 12. Thereby, the basic-wave generation circuit 12 starts generating the waveform data for constituting a basic wave.

When the waveform data is generated in accordance with these horizontal reset pulse HR, vertical clock VC, and vertical reset pulse VR, black and white points in the waveform shown in FIG. 6(A) are continuously generated. This can be understood by performing the comparison with the relation between the horizontal pulse HR, vertical clock VC, and vertical reset pulse VR when the SDTV is designated. The waveform data for constituting the basic wave generated by the basic-wave generation circuit 12 is supplied to the interpolation circuit 13 and waveform formation circuit 14.

As described above, when the EDTV-2 is designated, the input terminal-A side of the selection circuit 15 is normally selected in accordance with the selection signal SS output from the pulse generation circuit 11. Therefore, the interpolation circuit 13 interpolates the waveform data for constituting a basic wave output from the basic-wave generation circuit 12. However, the output of the interpolation circuit 13 is not used.

The waveform formation circuit 14 forms a basic wave output from the basic-wave generation circuit 12 and supplies it to the input terminal A of the selection circuit 15. The selection circuit 15 passes the waveform data input to the input terminal A and supplies it to the first line memory 16 and second line memory 17.

Figure 12:
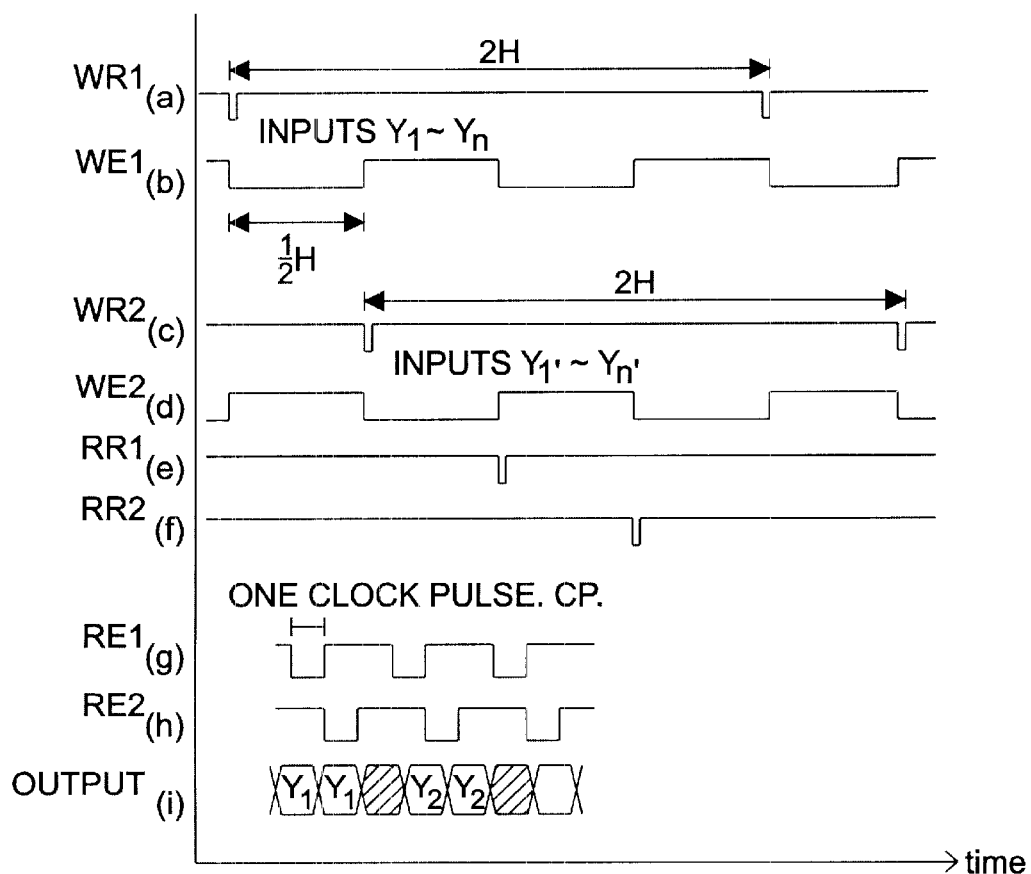
FIG. 12 is an illustration for explaining operations when the EDTV-2 is designated by the special-effect-waveform generator of the embodiment of the present invention in FIG. 1.

In the first line memory 16 and second line memory 17, waveform data is rearranged in accordance with the line-memory control pulse shown in FIG. 12. In this case, the first write reset pulse WR1 is a pulse becoming active (L-level) every two-fold horizontal period as shown. The second write reset pulse WR2 is a pulse delayed from the first write reset pulse WR1 by half horizontal period as shown. Moreover, the first write enable pulse WE1 is a pulse in which H level and L level alternately appear ever half horizontal period as shown. The second write enable pulse WE2 is a pulse in which the phase of the first write enable pulse WE1 is reversed as shown. The first read reset pulse RR1 is a pulse delayed from the first write reset pulse WR1 by one horizontal period as shown. The second read reset pulse RR2 is a pulse delayed from the first read reset pulse RR1 by half horizontal period as shown.

The first read enable pulse RE1 is a pulse using three clocks as one period as shown in FIG. 12 whose scale is enlarged. The second read enable pulse RE2 is a pulse using three clocks delayed from the first read enable pulse RE1 by one clock pulse CP as one period.

The line-memory control pulse operates as shown in FIG. 12 and thereby, the waveform data for constituting the waveform shown in FIG. 12 is output from the first line memory 16 and second line memory 17. In this case, it is necessary for the first line memory 16 and second line memory 17 to respectively have a capacity capable of storing the waveform data for two horizontal periods.

As described above, the present invention makes it possible to provide a special-effect-waveform generator capable of corresponding to signal formats of various television systems such as the SDTV, EDTV-2, and HDTV.

What is claimed is:

1. A special-effect-waveform generator comprising:
   a pulse generation circuit for generating a control pulse used to generate waveform data for constituting a special-effect waveform suitable for a signal format designated from an external unit;
   a basic-wave generation circuit for generating waveform data for constituting a basic wave in accordance with the control pulse output from the pulse generation circuit;
   an interpolation circuit for interpolating the waveform data for constituting the basic wave generated by the basic-wave generation circuit; and
   a selection circuit for selecting either of the waveform data interpolated by the interpolation circuit and the waveform data output from the basic-wave generation circuit in accordance with the signal format and outputting the selected waveform data as the waveform data for constituting a special-effect waveform.

2. A special-effect-waveform generator comprising:
   a pulse generation circuit for generating a control pulse used to generate waveform data for a special-effect waveform suitable for a signal format designated from an external unit, the control pulse representing horizontal and vertical synchronization timings;
   a basic-wave generation circuit for generating waveform data for a basic wave in accordance with the control pulse output from the pulse generation circuit; and
   a line memory operative to store waveform data in a horizontal period, to rearrange the waveform data for the basic wave generated by the basic-wave generation circuit and to output the rearranged waveform data as the waveform data for the special-effect waveform.

3. A special-effect-waveform generator comprising:
   a pulse generation circuit for generating a control pulse used to generate waveform data for constituting a special-effect waveform suitable for a signal format designated from an external unit;
   a basic-wave generation circuit for generating waveform data for constituting a basic wave in accordance with the control pulse output from the pulse generation circuit;
   an interpolation circuit for interpolating the waveform data for constituting the basic wave generated by the basic-wave generation circuit;
   a selection circuit for selecting either of the waveform data interpolated by the interpolation circuit and the waveform data output from the basic-wave generation circuit in accordance with the signal format; and
   a line memory for rearranging the waveform data output from the selection circuit and outputting the rearranged waveform data as a special-effect waveform.

4. The special-effect-waveform generator according to claim 1, wherein the selection circuit alternately selects the waveform data output from the basic-wave generation circuit and the waveform data output from the interpolation circuit when the waveform data interpolated by the interpolation circuit in accordance with the signal format is selected and thereby outputs the waveform data as the waveform data for constituting a special-effect waveform.

5. The special-effect-waveform generator according to claim 3, wherein the selection circuit alternately selects the waveform data output from the basic-wave generation circuit and the waveform data output from the interpolation circuit when the waveform data interpolated by the interpolation circuit in accordance with the signal format is selected and thereby outputs the waveform data as the waveform data for constituting a special-effect waveform.

6. A special-effect-waveform generator comprising:
   a pulse generation circuit for generating a control pulse used to generate waveform data for a special-effect waveform suitable for a signal format designated from an external unit;
   a basic-wave generation circuit for generating waveform data for a basic wave in accordance with the control pulse output from the pulse generation circuit; and
   a line memory operative to rearrange the waveform data for the basic wave generated by the basic-wave generation circuit and to output the rearranged waveform data as the waveform data for the special-effect waveform, wherein:
   the line memory includes a first line memory unit and a second line memory unit,
   the first line memory unit successively stores waveform data output from a selection circuit for an initial half horizontal period;
   the second line memory successively stores waveform data output from the selection circuit for the next half horizontal period: and thereafter,
   the content in the first line memory and the content in the second line memory are alternately read.

7. The special-effect-waveform generator according to claim 3, wherein the line memory is constituted with a first line memory and a second line memory, the first line memory successively stores the waveform data output from the selection circuit for the initial half horizontal period and the second line memory successively stores the waveform data output from the selection circuit for the next half horizontal period and thereafter, the content in the first line memory and the content in the second line memory are alternately read.

8. The special-effect-waveform generator according to claim 1, further comprising a waveform formation circuit, wherein the waveform data output from the basic-waveform generation circuit and the waveform data output from the interpolation circuit are respectively formed by the waveform formation circuit and thereafter, supplied to the selection circuit.

9. A special-effect-waveform generator comprising:
   a pulse generation circuit for generating a control pulse used to generate waveform data for a special-effect waveform suitable for a signal format designated from an external unit;
   a basic-wave generation circuit for generating waveform data for a basic wave in accordance with the control pulse output from the pulse generation circuit; and
   a line memory operative to rearrange the waveform data for the basic wave generated by the basic-wave generation circuit and to output the rearranged waveform data as the waveform data for the special-effect waveform, and further comprising:
   a waveform formation circuit,
   an interpolation circuit for interpolating the waveform data for the basic wave generated by the basic-wave generation circuit; and
   a selection circuit operative to select the waveform data interpolated by the interpolation circuit or the waveform data output from the basic-wave generation circuit in accordance with the signal format and to output the selected waveform data as the waveform data for the special-effect waveform, and wherein
   the waveform data output from the basic-waveform generation circuit and the waveform data output from the interpolation circuit are respectively formed by the waveform formation circuit and thereafter, supplied to the selection circuit.

10. The special-effect-waveform generator according to claim 3 further comprising
   a waveform formation circuit, and wherein
   the waveform data output from the basic-waveform generation circuit and the waveform data output from the interpolation circuit are respectively formed by the waveform formation circuit and thereafter, supplied to the selection circuit.

* * * * *